(12) United States Patent
Yamauchi et al.

(10) Patent No.: US 10,815,039 B2
(45) Date of Patent: Oct. 27, 2020

(54) PACKAGING BAG, AND METHOD FOR STORING MELT-PROCESSABLE POLYVINYL ALCOHOL RESIN WITH THE USE OF THE PACKAGING BAG

(71) Applicant: THE NIPPON SYNTHETIC CHEMICAL INDUSTRY CO., LTD., Osaka (JP)

(72) Inventors: Yoshihito Yamauchi, Osaka (JP); Norihito Sakai, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 15/777,452

(22) PCT Filed: Dec. 7, 2016

(86) PCT No.: PCT/JP2016/086343
§ 371 (c)(1),
(2) Date: May 18, 2018

(87) PCT Pub. No.: WO2017/104501
PCT Pub. Date: Jun. 22, 2017

(65) Prior Publication Data
US 2018/0346214 A1    Dec. 6, 2018

(30) Foreign Application Priority Data

Dec. 18, 2015    (JP) .................................. 2015-247047

(51) Int. Cl.
| | |
|---|---|
| *B65D 65/40* | (2006.01) |
| *B65D 81/26* | (2006.01) |
| *B32B 27/10* | (2006.01) |
| *B32B 27/32* | (2006.01) |
| *B32B 27/40* | (2006.01) |
| *B32B 27/36* | (2006.01) |
| *B32B 27/08* | (2006.01) |
| *B32B 29/00* | (2006.01) |
| *B32B 27/34* | (2006.01) |
| *B32B 27/28* | (2006.01) |

(52) U.S. Cl.
CPC ............. *B65D 65/40* (2013.01); *B32B 27/08* (2013.01); *B32B 27/10* (2013.01); *B32B 27/285* (2013.01); *B32B 27/32* (2013.01); *B32B 27/34* (2013.01); *B32B 27/36* (2013.01); *B32B 27/40* (2013.01); *B32B 29/002* (2013.01); *B65D 81/26* (2013.01); *B32B 2250/03* (2013.01); *B32B 2250/40* (2013.01); *B32B 2307/31* (2013.01); *B32B 2307/724* (2013.01); *B32B 2307/7246* (2013.01); *B32B 2307/732* (2013.01); *B32B 2439/46* (2013.01); *B32B 2553/00* (2013.01)

(58) Field of Classification Search
CPC ............ B32B 2250/03; B32B 2250/40; B32B 2307/31; B32B 2307/724; B32B 2307/7246; B32B 2307/732; B32B 27/08; B32B 27/10; B32B 27/285; B32B 27/32; B32B 27/34; B32B 27/36; B32B 27/40; B32B 29/002; B65D 65/40; B65D 81/26
See application file for complete search history.

(56) References Cited

U.S. PATENT DOCUMENTS

2012/0041118 A1    2/2012    Shibutani et al.

FOREIGN PATENT DOCUMENTS

| JP | 2004-075866 A | 3/2004 |
|---|---|---|
| JP | 2008-308174 A | 12/2008 |
| JP | 2011-010697 A | 1/2011 |
| JP | 2011-021075 A | 2/2011 |
| JP | 2011-241234 A | 12/2011 |
| JP | 2012-067180 A | 4/2012 |
| JP | 2014142061 * | 8/2014 |
| KR | 2010-110553 A | 10/2010 |
| WO | 2014/104259 A1 | 7/2014 |

OTHER PUBLICATIONS

International Search Report from Patent Application No. PCT/JP2016/086343, dated Feb. 28, 2017.
International Preliminary Report on Patentability from Patent Application No. PCT/JP2016/086343, dated Jun. 19, 2018.
Supplemental European Search Report issued for the European Patent Application No. 16875481.0 (dated Apr. 16, 2019).
CN OA issued for Chinese Patent Application No. 201680065720.3 dated Jun. 4, 2019 with English translation.

* cited by examiner

*Primary Examiner* — Yan Lan
(74) *Attorney, Agent, or Firm* — Greenblum & Bernstein, P.L.C.

(57) ABSTRACT

A packaging bag for packaging a melt-processable polyvinyl alcohol resin is formed from a film having a methanol vapor transmission rate of 0.5 to 1000 g/m²·day. A method of storing a melt-processable polyvinyl alcohol resin includes the step of sealingly packaging melt-processable polyvinyl alcohol resin particles with the use of the packaging bag formed from the aforementioned film. Where the melt-processable polyvinyl alcohol resin is packaged with the use of the packaging bag, therefore, an organic solvent remaining in the packaged polyvinyl alcohol resin can be released in the form of vapor to the outside through the packaging bag to dissipate, whereby the resulting polyvinyl alcohol resin has a reduced organic solvent concentration after storage thereof in the packaging bag. As a result, the melt-processable polyvinyl alcohol resin is improved in forming stability.

7 Claims, No Drawings

PACKAGING BAG, AND METHOD FOR STORING MELT-PROCESSABLE POLYVINYL ALCOHOL RESIN WITH THE USE OF THE PACKAGING BAG

TECHNICAL FIELD

The present disclosure relates to a packaging bag for packaging a melt-processable polyvinyl alcohol resin, and a method for storing the melt-processable polyvinyl alcohol resin with the use of the packaging bag. More specifically, the present disclosure relates to a packaging bag that ensures excellent forming stability of the melt-processable polyvinyl alcohol resin, and a method for storing the melt-processable polyvinyl alcohol resin.

BACKGROUND ART

A polyvinyl alcohol (hereinafter sometimes referred to as "PVA") resin to be used for melt processing is typically synthesized with the use of an organic solvent such as methanol for production thereof. The PVA resin is generally stored and delivered in a solid form (in a powdery or granular form). In general, a melt-processable hydrophilic resin is packaged in a moisture resistant packaging bag (e.g., an aluminum bag) having an excellent water vapor barrier property for prevention of moisture absorption. Such a packaging bag is used for packaging various melt-processable hydrophilic resins. For example, the packaging bag is used for packaging a saponified ethylene-vinyl acetate copolymer, and a PVA resin containing a structural unit having a 1,2-glycol bond at its side chain as described in PTL 1.

RELATED ART DOCUMENT

Patent Document

PTL 1: JP-A-2004-075866

SUMMARY OF INVENTION

A water-insoluble resin such as saponified ethylene-vinyl acetate copolymer is cooled and washed with water and, therefore, the organic solvent remains only in a trace amount in the water-insoluble resin. However, water-soluble PVA resin cannot be washed with water, so that the organic solvent (e.g., methanol) used in its production generally remains in the resin.

If the organic solvent used in the production thus remains in the PVA resin after the production, the evaporated organic solvent is confined in the sealed packaging bag, and is not released to the outside. As a result, the organic solvent is not sufficiently removed from the PVA resin, but remains in the PVA resin. If the melt-processable PVA resin containing the organic solvent is used as a material for melt processing, therefore, the organic solvent is evaporated from the PVA resin during the melt processing, making it difficult to stably melt-process the PVA resin.

In view of the foregoing, the present disclosure provides a packaging bag that is capable of releasing the evaporated organic solvent during the storage of the melt-processable PVA resin to ensure improved forming stability of the melt-processable PVA resin, and a method for storing the melt-processable PVA resin with the use of the packaging bag.

In view of the foregoing, the inventors of the present invention conducted intensive studies on the properties of the packaging bag to be used for sealingly storing the melt-processable PVA resin. As a result, the inventors found that the packaging bag is required to have a specific physical property such that, when the organic solvent (e.g., methanol) remaining in the PVA resin is confined in the form of vapor in the packaging bag, the methanol vapor can be released to the outside through the packaging bag, and that the problem described above can be solved by using a packaging bag formed from a film that has a specific methanol vapor transmission rate to easily transmit the methanol vapor.

According to a first inventive aspect, there is provided a packaging bag for packaging a melt-processable PVA resin, the packaging bag comprising a film having a methanol vapor transmission rate of 0.5 to 1000 g/m$^2$·day.

According to a second inventive aspect, there is provided a method of storing a melt-processable PVA resin for sealingly packaging melt-processable PVA resin particles with the use of a packaging bag comprising a film having a methanol vapor transmission rate of 0.5 to 1000 g/m$^2$·day.

As described above, the inventive packaging bag is adapted to package the melt-processable PVA resin (hereinafter sometimes referred to simply as "PVA resin"), and is formed from the film having the specific methanol vapor transmission rate. Where the melt-processable PVA resin is packaged with the use of the packaging bag, therefore, the organic solvent (e.g., methanol) remaining in the sealed PVA resin can be released in the form of vapor to the outside through the packaging bag to dissipate, whereby the resulting PVA resin has a reduced organic solvent concentration after storage thereof in the packaging bag. As a result, the melt-processable PVA resin is improved in forming stability.

Where the film has a water vapor transmission rate of not higher than 1000 g/m$^2$·day, the melt-processable PVA resin is further improved in forming stability because the PVA resin is substantially free from increase in volatile content that may otherwise occur due to the moisture absorption of the PVA resin after long-term storage of the PVA resin.

Where the packaging bag has a multilayer structure including a base layer, a methanol vapor permeable film layer and a protective layer and, particularly, at least one of the base layer and the protective layer is craft paper, the packaging bag has a higher strength during transportation thereof.

Where the packaging bag has a thickness of 10 to 2000 μm, the packaging bag is more advantageous in costs and strength.

DESCRIPTION OF EMBODIMENTS

Embodiments of the present disclosure will hereinafter be described in detail by way of example (typical example) but not by way of limitation.

The inventive packaging bag is used for sealingly packaging a melt-processable PVA resin, and is formed from a film having a specific methanol vapor transmission rate.

<Packaging Bag>

First, the packaging bag will be described in detail.

The inventive packaging bag may have a single-layer structure (made of a single-layer film) or a multi-layer structure (made of a multi-layer film), and the film for the structure has a methanol vapor transmission rate of 0.5 to 1000 g/m$^2$·day.

The methanol vapor transmission rate is measured in the following manner. In conformity with "Testing Methods for Determination of Water Vapor Transmission Rate of Moisture-Proof Packaging Materials (Dish Method)" specified in JIS Z0208, a moisture-permeable cup covered with a packaging material with methanol contained therein is allowed to stand still at 23° C. at 50% RH for 24 hours, and then a weight loss of the cup is measured and defined as a methanol transmission amount. Based on the methanol transmission amount, the methanol vapor transmission rate is calculated.

Further, the film for the structure of the inventive packaging bag preferably has a water vapor transmission rate of not higher than 1000 g/m²·day as well as the aforementioned specific methanol vapor transmission rate.

In the present disclosure, the water vapor transmission rate is measured at 40° C. at 90% RH in conformity with JIS Z0208.

Where the inventive packaging bag has the single-layer structure, the inventive packaging bag includes only a film capable of transmitting methanol vapor (methanol vapor permeable film layer). Where the inventive packaging bag has the multi-layer structure, examples of the multi-layer structure include a basic structure including a base layer and a methanol vapor permeable film layer, and a basic structure including a base layer, a methanol vapor permeable film layer and a protective layer.

The respective layers will hereinafter be described.

In the present disclosure, the methanol vapor permeable film layer has a methanol vapor transmission rate of 0.5 to 1000 g/m²·day, preferably 0.5 to 500 g/m²·day, more preferably 1.0 to 100 g/m²·day, further preferably 1.0 to 50 g/m²·day, particularly preferably 1.0 to 25 g/m²·day, especially preferably 1.5 to 6 g/m²·day. If the methanol vapor transmission rate is too high, there is a possibility that organic solvent volatile components in the outside air enter the packaging bag. If the methanol vapor transmission rate is too low, it will be impossible to effectively release the organic solvent (e.g., methanol) to the outside through the packaging bag, failing to provide the effect of the present disclosure.

Further, the methanol vapor permeable film layer preferably has a water vapor transmission rate of not higher than 1000 g/m²·day, more preferably not higher than 750 g/m²·day, particularly preferably not higher than 500 g/m²·day, further preferably not higher than 50 g/m²·day, especially preferably not higher than 17 g/m²·day. The lower limit of the water vapor transmission rate is 0.5 g/m²·day. If the water vapor transmission rate is too high, water vapor is liable to intrude into the packaging bag to be absorbed by the PVA resin, thereby increasing the volatile content of the PVA resin. As a result, the melt-processable PVA resin tends to be poorer in forming stability after being stored for a long period of time.

The methanol vapor permeable film layer typically has a thickness of 1 to 500 μm, preferably 10 to 300 μm, particularly preferably 20 to 250 μm, further preferably 50 to 200 μm. If the thickness is too small, the water vapor transmission rate tends to be increased. If the thickness is too large, the costs tend to be increased, and the packaging bag tends to be poorer in flexibility.

Exemplary materials for the methanol vapor permeable film layer include a high-density polyethylene, a medium-density polyethylene, a low-density polyethylene, a polypropylene and a polyester. Of these materials, the low-density polyethylene is preferably used from the viewpoint of economy, flexibility, methanol vapor transmission rate and water vapor barrier property.

In the present disclosure, the low-density polyethylene is a polyethylene having an average density of 0.910 to 0.925 g/cm³, and the medium-density polyethylene is a polyethylene having an average density of 0.926 to 0.940 g/cm³.

The high-density polyethylene is a polyethylene having an average density of not less than 0.941 g/cm³.

The methanol vapor permeable film layer may be a single-layer film or a multi-layer film including two or more films of the same type or different types. Therefore, the thickness of the methanol vapor permeable film layer is the thickness of the single-layer film or the total thickness of the two or more films.

The inventive packaging bag is required to have a sufficient strength during transportation thereof and, therefore, preferably includes a layer of a paper material provided as the base layer inward of the methanol vapor permeable film layer. The paper material is simply required to have a strength sufficient for the transportation, and craft paper is typically used as the paper material. The craft paper typically has a thickness of 10 to 1000 μm, preferably 50 to 500 μm, particularly preferably 70 to 200 μm. If the thickness of the craft paper is too small, the packaging bag is liable to have an insufficient strength to be thereby broken. If the thickness of the craft paper is too large, the packaging bag is liable to have a greater weight and, therefore, is not suitable for the transportation.

Alternatively, the base layer may be a resin film. Examples of the resin film include a polyester film, a polyolefin film, a polyamide film, a polyether film and a polyurethane film, among which the polyamide film is particularly preferred. Examples of the polyamide film include a nylon 11 film, a nylon 12 film, a nylon 6 film, a nylon 66 film and a nylon 6/66 film. The resin film is preferably the polyolefin film or the polyamide film, and particularly preferably the polyamide film or a low-density polyethylene film.

Where the base layer is the resin film, the base layer may also serve as the methanol vapor permeable film layer. In this case, the thickness of the methanol vapor permeable film layer is the total thickness of the base layer (resin film) and the original methanol vapor permeable film layer.

The base layer (resin film) typically has a thickness of 1 to 100 μm, preferably 5 to 50 μm, particularly preferably 10 to 30 μm. If the thickness of the base layer is too small, the packaging bag tends to have a lower strength and suffer from pinholes. If the thickness of the base layer is too large, the costs of the packaging bag tend to be increased.

Further, the base layer may have a single-layer structure, or a multi-layer structure including two or more different layers such as a paper material and a resin film. The base layer and the methanol vapor permeable film layer may be bonded to each other or may not be bonded to each other.

A paper material or a resin film is used as a protective layer formation material for the protective layer. Examples of the protective layer formation material include those for the base layer formation material described above, among which the paper material is preferred and the craft paper is further preferred for strength.

The protective layer may also serve as the methanol vapor permeable film layer. In this case, the thickness of the methanol vapor permeable film layer is the total thickness of the protective layer and the original methanol vapor permeable film layer.

Further, the protective layer may have a single-layer structure, or a multi-layer structure including two or more different layers such as a paper material and a resin film. The protective layer and the methanol vapor permeable film layer may be bonded to each other or may not be bonded to each other.

The protective layer typically has a thickness of 5 to 200 μm, preferably 20 to 100 μm, particularly preferably 30 to 80

μm. If the thickness of the protective layer is too small, the packaging bag tends to have a lower strength and suffer from pinholes. If the thickness of the protective layer is too large, the costs of the packaging bag tend to be increased.

The overall thickness of the inventive packaging bag is typically 10 to 2000 μm, preferably 20 to 500 μm, particularly preferably 25 to 300 μm, in consideration of the costs, the strength and the use of the packaging bag. If the overall thickness of the packaging bag is too small, the packaging bag tends to have a lower strength. If the overall thickness of the packaging bag is too large, it will be impossible to efficiently produce the packaging bag with a longer period required for heat-sealing or the like.

The inventive packaging bag may be produced, for example, by preparing two sheets of the aforementioned film having the specific physical property (having the single-layer structure or the multi-layer structure) and staking the sheets, and heat-sealing three edges of the resulting stack with one edge of the stack left unsealed to form an opening. Alternatively, the packaging bag may be produced by preparing a single sheet of the aforementioned film, folding the sheet into half, and heat-sealing two edges of the folded sheet with one edge of the sheet left unsealed to form an opening.

<Melt-Processable PVA Resin>

The melt-processable PVA resin to be packaged in the inventive packaging bag will be described.

The PVA resin to be used for the melt processing in the present disclosure is a PVA resin that is modified as having a lower melting point than an ordinary PVA resin to be thereby made melt-processable. Examples of the PVA resin include an unmodified PVA resin having a lower saponification degree and various modified PVA resins. Specific examples of the modified PVA resins include a PVA resin having a primary hydroxyl group-containing structural unit at its side chain, and an oxyalkylene-containing PVA resin. Particularly, the PVA resin having the primary hydroxyl group-containing structural unit at its side chain (e.g., a PVA resin having a 1,2-diol structural unit at its side chain, a PVA resin having a hydroxyalkyl group at its side chain or the like) is preferred, and the PVA resin having the 1,2-diol structural unit at its side chain is particularly preferred. Where a modified PVA resin is used, the modified PVA resin typically has a modifying group content of 0.1 to 20 mol %, particularly preferably 1 to 10 mol %.

The PVA resin to be used in the present disclosure typically has a saponification degree of 70 to 100 mol %, preferably 75 to 99 mol %, particularly preferably 80 to 99 mol % (as measured in conformity with JIS K6726). If the saponification degree of the PVA resin is too low, the PVA resin tends to be poorer in thermal stability during the forming and to have a lower melt tension.

The PVA resin preferably has an average polymerization degree of 200 to 4000, particularly preferably 250 to 1000, especially preferably 300 to 800 (as measured in conformity with JIS K6726). If the average polymerization degree is too low, a product formed from the PVA resin tends to have an insufficient strength. If the average polymerization degree is excessively high, on the other hand, the PVA resin tends to suffer from significant shear heat generation, resulting in poorer forming stability.

[PVA Resin Having 1,2-Diol Structural Unit at its Side Chain]

In the present disclosure, as described above, the PVA resin having the 1,2-diol structural unit at its side chain (hereinafter sometimes referred to as "side-chain 1,2-diol-containing PVA resin") is preferably used as the PVA resin from the viewpoint of the melt processability.

The side-chain 1,2-diol-containing PVA resin will hereinafter be described in detail.

The side-chain 1,2-diol-containing PVA resin has a structural unit represented by the following general formula (1):

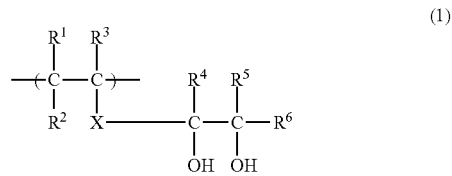

wherein $R^1$, $R^2$ and $R^3$ are each independently a hydrogen atom or an organic group, X is a single bond or a bonding chain, and $R^4$, $R^5$ and $R^6$ are each independently a hydrogen atom or an organic group.

In the structural unit represented by the general formula (1), $R^1$, $R^2$, $R^3$, $R^4$, $R^5$ and $R^6$ are preferably all hydrogen atoms, and X is preferably a single bond. That is, a PVA resin having a structural unit represented by the following formula (2) is preferably used.

In the structural unit represented by the general formula (1), $R^1$, $R^2$, $R^3$, $R^4$, $R^5$ and $R^6$ may be each an organic group, as long as the properties of the resin are not significantly impaired. Examples of the organic group include C1 to C4 alkyl groups such as a methyl group, an ethyl group, a n-propyl group, an isopropyl group, a n-butyl group, an isobutyl group and a tert-butyl group. These organic groups may each have a functional group such as a halogen group, a hydroxyl group, an ester group, a carboxylic acid group or a sulfonic acid group as required.

In the structural unit represented by the general formula (1), X is preferably a single bond from the viewpoint of the thermal stability and the stability at a higher temperature or under acidic conditions. However, X may be a bonding chain, as long as the effects of the present disclosure are not impaired. Examples of the bonding chain include hydrocarbon chains such as alkylenes, alkenylenes, alkynylenes, phenylene and naphthylene (which may be substituted with a halogen such as fluorine, chlorine or bromine), —O—, —($CH_2O$)$_m$—, —(O$CH_2$)$_m$—, —($CH_2O$)$_m$$CH_2$—, —CO—, —COCO—, —CO($CH_2$)$_m$CO—, —CO($C_6H_4$)CO—, —S—, —CS—, —SO—, —$SO_2$—, —NR—, —CONR—, —NRCO—, —CSNR—, —NRCS—, —NRNR—, —$HPO_4$—, —Si(OR)$_2$—, —OSi(OR)$_2$—, —OSi(OR)$_2$O—, —Ti(OR)$_2$—, —OTi(OR)$_2$—, —OTi(OR)$_2$O—, —Al(OR)—, —OAl(OR)— and —OAl(OR)O— (wherein R is independently a given substituent group, preferably a hydrogen atom or a C1 to C12 alkyl group, and m is a natural number). From the viewpoint of the stability during production or during use, an alkylene having a carbon number of not greater than 6 is preferred, and methylene or —$CH_2OCH_2$— is particularly preferred.

Exemplary methods for producing the side-chain 1,2-diol-containing PVA resin to be used in the present disclosure include: (i) a method in which a copolymer of a vinyl ester monomer and a compound represented by the following general formula (3) is saponified; (ii) a method in which a copolymer of a vinyl ester monomer and a compound represented by the following general formula (4) is saponified and deketalized; and (iii) a method in which a copolymer of a vinyl ester monomer and a compound represented by the following general formula (5) is saponified and decarbonated.

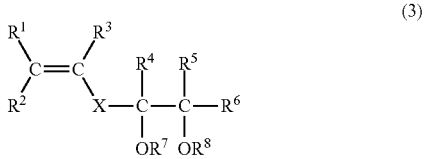

(3)

wherein $R^1$, $R^2$ and $R^3$ are each independently a hydrogen atom or an organic group, X is a single bond or a bonding chain, $R^4$, $R^5$ and $R^6$ are each independently a hydrogen atom or an organic group, and $R^7$ and $R^8$ are each independently a hydrogen atom or $R^9$—CO— (wherein $R^9$ is an alkyl group).

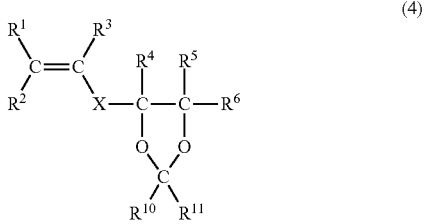

(4)

wherein $R^1$, $R^2$ and $R^3$ are each independently a hydrogen atom or an organic group, X is a single bond or a bonding chain, $R^4$, $R^5$ and $R^6$ are each independently a hydrogen atom or an organic group, and $R^{10}$ and $R^{11}$ are each independently a hydrogen atom or an organic group.

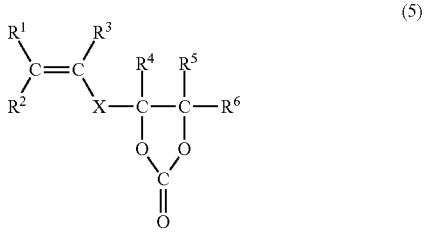

(5)

wherein $R^1$, $R^2$ and $R^3$ are each independently a hydrogen atom or an organic group, X is a single bond or a bonding chain, and $R^4$, $R^5$ and $R^6$ are each independently a hydrogen atom or an organic group.

In the general formulae (3), (4) and (5), $R^1$, $R^2$, $R^3$, X, $R^4$, $R^5$ and $R^6$ are the same as those in the general formula (1). In the general formula (3), $R^7$ and $R^8$ are each independently a hydrogen atom or $R^9$—CO— (wherein $R^9$ is an alkyl group, preferably a C1 to C4 alkyl group). In the general formula (4), $R^{10}$ and $R^{11}$ are each independently a hydrogen atom or an organic group, preferably a C1 to C4 alkyl group.

The methods (i), (ii) and (iii) for producing the side-chain 1,2-diol-containing PVA resin are described, for example, in JP-A-2006-95825.

In the method (i), 3,4-diacyloxy-1-butene, particularly 3,4-diacetoxy-1-butene, is preferably used as the compound represented by the general formula (3) from the viewpoint of copolymerization reactivity and industrial handling ease.

Where vinyl acetate is used as the vinyl ester monomer and 3,4-diacetoxy-1-butene is copolymerized with vinyl acetate, the reactivity ratio (r) of vinyl acetate is $r_{(vinyl\ acetate)}$=0.710, and the reactivity ratio (r) of 3,4-diacetoxy-1-butene is $r_{(3,4-diaceto-x-butene)}$=0.701. Where vinyl ethylene carbonate to be used as an example of the compound represented by the general formula (5) in the method (iii) is copolymerized with vinyl acetate, the reactivity ratio (r) of vinyl acetate is $r_{(vinyl\ acetate)}$=0.85, and the reactivity ratio (r) of vinyl ethylene carbonate is $r_{(vinyl\ ethylene\ carbonate)}$=5.4. Therefore, the reactivity of 3,4-diacetoxy-1-butene is higher than the reactivity of vinyl ethylene carbonate for the copolymerization with vinyl acetate.

Further, the chain transfer constant (Cx) of 3,4-diacetoxy-1-butene is $Cx_{(3,4-diacetoxy-1-butene)}$=0.003 (at 65° C.). The chain transfer constant (Cx) of vinyl ethylene carbonate is $Cx_{(vinyl\ ethylene\ carbonate)}$=0.005 (at 65° C.). The chain transfer constant (Cx) of 2,2-dimethyl-4-vinyl-1,3-dioxolane to be used as an example of the compound represented by the general formula (4) in the method (ii) is $Cx_{(2,2-dimethyl-4-vinyl-1,3-dioxolane)}$=0.023 (at 65° C.). This means that 3,4-diacetoxy-1-butene is more effective in increasing the polymerization degree and is less liable to reduce the polymerization speed than vinyl ethylene carbonate and 2,2-dimethyl-4-vinyl-1,3-dioxolane.

Further, 3,4-diacetoxy-1-butene is industrially advantageous in that a by-product produced by the saponification of the resulting copolymer is the same as a compound by-produced from the structural unit derived from vinyl acetate often used as the vinyl ester monomer during the saponification, and conventional facilities can be used for the post treatment of the by-product and the recovery of a solvent without the need for a special apparatus and a special process step.

Exemplary methods for preparing 3,4-diacetoxy-1-butene include a method in which 3,4-diacetoxy-1-butene is synthesized through an epoxybutene derivative as disclosed in WO2000/24702, U.S. Pat. Nos. 5,623,086 or 6,072,079, and a method in which 1,4-diacetoxy-1-butene produced as an intermediate product in production of 1,4-butanediol is isomerized in the presence of a metal catalyst such as palladium chloride.

A reagent grade product of 3,4-diacetoxy-1-butene is commercially available from Acros Inc.

If the decarbonation or the deketalization is insufficient in the production of the side-chain 1,2-diol-containing PVA resin in the method (ii) or (iii), a carbonate ring or an acetal ring remains at the side chain and, therefore, the PVA resin is liable to be crosslinked by the remaining ring group in a heat-drying step of the production process, resulting in gelation.

For this reason, the side-chain 1,2-diol-containing PVA resin produced by the method (i) is advantageously used in the present disclosure.

Examples of the vinyl ester monomer include vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate and vinyl versatate, among which vinyl acetate is preferred for economy.

Another comonomer may be copolymerized with the aforementioned monomers (the vinyl ester monomer and the compound represented by the above general formula (3), (4) or (5)), as long as the properties of the resin are not significantly influenced. Examples of the comonomer include α-olefins such as ethylene and propylene; hydroxyl group-containing α-olefins such as 3-buten-1-ol, 4-penten-1-ol and 5-hexen-1,2-diol, and acylation products and other derivatives of these hydroxyl group-containing α-olefins; hydroxymethyl vinylidene diacetates such as 1,3-diacetoxy-2-methylenepropane, 1,3-dipropionyloxy-2-methylenepropane and 1,3-dibutyronyloxy-2-methylenepropane; unsaturated acids such as itaconic acid, maleic acid and acrylic acid, and salts and monoalkyl and dialkyl esters of these unsaturated acids; nitriles such as acrylonitrile; amides such as methacrylamide and diacetoneacrylamide; olefin sulfonic acids such as ethylenesulfonic acid, allylsulfonic acid, methallylsulfonic acid and 2-acrylamido-2-methylpropanesulfonic acid (AMPS), and salts of these olefin sulfonic acids.

The side-chain 1,2-diol-containing PVA resin typically has a saponification degree of 70 to 100 mol %, preferably 75 to 90 mol %, especially preferably 80 to 89 mol %, further preferably 85 to 88 mol % (as measured in conformity with JIS K6726). If the saponification degree is too low, the PVA resin tends to be poorer in thermal stability during the forming, and to have a lower melt tension.

The content of the structural unit represented by the general formula (1) in the side-chain 1,2-diol-containing PVA resin is typically 0.1 to 20 mol %, preferably 1 to 10 mol %, especially preferably 2 to 8 mol %.

The content of the structural unit represented by the general formula (1) in the side-chain 1,2-diol-containing PVA resin may be determined based on $^1$H-NMR spectrum of the PVA resin produced through the complete saponification (obtained by using DMSO-d6 as a solvent and tetramethylsilane as an internal standard). More specifically, the content of the structural unit represented by the general formula (2) is calculated based on peak areas attributable to hydroxyl proton, methine proton and methylene proton of the structural unit, methylene proton of the main chain, and proton of a hydroxyl group bonded to the main chain.

The side-chain 1,2-diol-containing PVA resin preferably has an average polymerization degree of 200 to 3000, particularly preferably 250 to 1000, especially preferably 300 to 800 (as measured in conformity with JIS K6726). If the average polymerization degree is too low, the resulting formed product tends to have a lower strength. If the average polymerization degree is excessively high, on the other hand, the PVA resin tends to suffer from significant shear heat generation, resulting in poorer forming stability.

The melt-processable PVA resin to be used in the present disclosure is typically provided in a powdery form, a granular form or a pellet form, preferably in the powdery form or the granular form for production of the PVA resin. The melt-processable PVA resin has an average particle diameter of 50 to 2000 μm, preferably 100 to 1700 μm, particularly preferably 150 to 1500 μm. If the average particle diameter is too small, the PVA resin is liable to be easily scattered, resulting in difficulty in handling. If the average particle diameter is too large, the PVA resin tends to suffer from unstable extrusion rate during the forming.

The average particle diameter is measured through a particle sieve method, and a particle diameter having a cumulative frequency of 50 wt. % in a particle diameter distribution is defined as the average particle diameter.

After the production, the melt-processable PVA resin generally contains a small amount of an organic solvent (alcohol such as methanol) and water. That is, the PVA resin generally contains a certain amount of methanol used as the organic solvent for the cleaning and the saponification, and a small amount of water. The content of the organic solvent (alcohol such as methanol) is typically 0.1 to 10 wt. %, and the content of water is typically not higher than 5 wt. %, preferably not higher than 3 wt. %. The aforementioned problem occurs due to the presence of the organic solvent (alcohol such as methanol) in the melt-processable PVA resin.

[Storage Method]

A method for storing the melt-processable PVA resin will be described as an exemplary use application of the inventive packaging bag. For example, particles of the melt-processable PVA resin are fed into the inventive packaging bag through the opening of the packaging bag, and then an opening portion of the packaging bag is heat-sealed. In the feeding of the melt-processable PVA resin particles, a dry inert gas (e.g., nitrogen gas or the like) is preferably used as a carrier gas. Where the craft paper is provided as an outermost layer of the packaging bag, the melt-processable PVA resin particles are typically packaged in the packaging bag for the storage thereof by sewing the opening portion by a sewing machine and folding the opening portion. The packaging bag containing the melt-processable PVA resin particles fed and sealingly packaged therein is supplied, for example, to various transportation means. Thereafter, the melt-processable PVA resin is typically processed through a pelletization process, and then the resulting pellets are used as a material for extrusion, injection molding or other forming process.

After the melt-processable PVA resin is stored for a long period of time with the use of the inventive packaging bag, the melt-processable PVA resin preferably has a methanol content of not higher than 1 wt. % and a water content of not higher than 3 wt. %. With the methanol content and the water content thus controlled, the melt-processable PVA resin can be melt-processed with improved forming stability.

EXAMPLES

The present disclosure will hereinafter be described by way of examples thereof. It should be understood that the present disclosure be not limited to the inventive examples within the scope of the present disclosure.

In the examples, "parts" and "%" are based on weight.

Example 1

[Side-Chain 1,2-Diol-Containing PVA Resin]

First, 76.6 parts (an initial feed ratio of 40%) of vinyl acetate, 14.2 parts of methanol and 9.2 parts (an initial feed ratio of 40%) of 3,4-diacetoxy-1-butene were fed into a reaction vessel provided with a reflux condenser and a stirrer, and then azobisisobutyronitrile was fed into the reaction vessel in an amount of 0.068 mol % based on the amount of the fed vinyl acetate. The resulting mixture was heated while being stirred in a nitrogen stream. Then, the rests of vinyl acetate and 3,4-diacetoxy-1-butene were fed dropwise at a constant rate for 13.5 hours, whereby polymerization was allowed to proceed. When the polymerization degree of vinyl acetate reached 91%, m-dinitrobenzene was added to the resulting mixture to terminate the polymerization. Subsequently, methanol vapor was blown into the resulting mixture, whereby unreacted vinyl acetate monomer was removed to the outside. Thus, a methanol solution of a copolymer was obtained.

In turn, the methanol solution of the copolymer was further diluted with methanol to a concentration of 50%, and the resulting methanol solution of the copolymer was fed into a kneader. While the solution temperature was maintained at 35° C., sodium hydroxide was added in the form of a 2% methanol solution in a proportion of 4.5 mmol based on 1 mol of the total of the vinyl acetate structural unit and the 3,4-diacetoxy-1-butene structural unit of the copolymer to the methanol solution of the copolymer for saponification of the copolymer. As the saponification proceeded, a saponification product was precipitated. The resulting particulate product was filtered, rinsed with methanol, and dried in a hot air dryer. Thus, an intended side-chain 1,2-diol-containing PVA resin (powder) was produced.

The side-chain 1,2-diol-containing PVA resin thus produced had a saponification degree of 99 mol % as determined by analyzing an alkali consumption required for hydrolysis of remaining vinyl acetate and 3,4-diacetoxy-1-butene. Further, the side-chain 1,2-diol-containing PVA resin had an average polymerization degree of 470 as analyzed in conformity with JIS K6726. The content of the structural unit having the 1,2-diol bond at the side chain was 6 mol % as calculated based on an integration value measured through 1H-NMR (by means of a 300 MHz proton NMR with the use of a d6-DMSO solution and an internal standard substance of tetramethylsilane at 50° C.).

(Packaging bag) A packaging bag was produced as having a structure of craft paper/methanol vapor permeable film layer/craft paper. A 100-μm thick film of a low-density polyethylene (having an MFR of 0.9 g/10 minutes and a density of 0.924 g/cm$^3$) was used as a material for the methanol vapor permeable film layer. The 100-μm thick low-density polyethylene film had a methanol vapor transmission rate of 4 g/m$^2$·day (at 23° C. at 50% RH) and a water vapor transmission rate of 9 g/m$^2$·day (at 40° C. at 90% RH). The methanol vapor transmission rate was measured at 23° C. at 50% RH by the aforementioned method. The water vapor transmission rate was measured at 40° C. at 90% RH in conformity with JIS Z0208 as described above. In the following examples, the methanol vapor transmission rate and the water vapor transmission rate were respectively measured in the same manners.

(Long-Term Storage Conditions)

After the side-chain 1,2-diol-containing PVA resin powder was fed into the packaging bag through the opening, an upper opening portion of the packaging bag was heat-sealed. The packaging bag was stored at 40° C. at 75% RH for 90 days.

<Pelletization Evaluation>

The side-chain 1,2-diol-containing PVA resin powder stored in the packaging bag was fed into a melt extruder (twin screw type TEM-58BS available from Toshiba Machine Co., Ltd.), then melt-kneaded, and extruded into a single rod-shaped strand (having a diameter of 2.0 mm). Then, the strand was cooled and cut. Thus, pellets of the side-chain 1,2-diol-containing PVA resin were produced. This pelletization process was evaluated based on the following criteria. The evaluation result is shown below in Table 1.

A: The melt extruder was stably operated, and the resulting pellets had a very low volatile content.
B: The melt extruder was stably operated, and the resulting pellets had a low volatile content.
C: The melt extruder was stably operated, and the resulting pellets had a high volatile content.
D: The melt extruder was unstably operated with the PVA resin flowing back to a hopper, but the resulting pellets had proper shape.
E: The melt extruder was unstably operated with the PVA resin flowing back to a hopper, and the resulting pellets had improper shape.

(Melt Conditions)

Diameter (D): 58 mm, L/D=46
Screw rotation speed: 150 rpm
Temperature setting (° C.): C1/C2/C3/C4/C5/C6/C7/C8/C9/C10/H/D1/D2/D3=50/70/180/180/220/220/220/210/200/200/210/210/195/210
Screw pattern: Twin kneading screw
Screen mesh: 50/80/50 μmesh
Extrusion rate: 200 kg/hr
Position of vent 3: C4 (having a vent diameter of 100 mm)
Position of vent 4: C8 (having a vent diameter of 100 mm)

Example 2

A packaging bag was produced as having the same structure in substantially the same manner as in Example 1, except that the low-density polyethylene film for the methanol vapor permeable film layer had a thickness of 50 μm. The 50-μm thick low-density polyethylene film had a methanol vapor transmission rate of 7 g/m$^2$·day (at 23° C. at 50% RH) and a water vapor transmission rate of 18 g/m$^2$·day (at 40° C. at 90% RH). The pelletization of PVA resin stored in the packaging bag thus produced was evaluated in the same manner as in Example 1. The evaluation result is shown below in Table 1.

Example 3

A packaging bag was produced as having the same structure in substantially the same manner as in Example 1, except that the low-density polyethylene film had a thickness of 30 μm. The 30-μm thick low-density polyethylene film had a methanol vapor transmission rate of 12 g/m$^2$·day (at 23° C. at 50% RH) and a water vapor transmission rate of 30 g/m$^2$·day (at 40° C. at 90% RH). The pelletization of PVA resin stored in the packaging bag thus produced was evaluated in the same manner as in Example 1. The evaluation result is shown below in Table 1.

Example 4

A packaging bag was produced as having the same structure in substantially the same manner as in Example 1, except that the low-density polyethylene film had a thickness of 10 μm. The 10-μm thick low-density polyethylene film had a methanol vapor transmission rate of 37 g/m$^2$·day (at 23° C. at 50% RH) and a water vapor transmission rate of 90 g/m$^2$·day (at 40° C. at 90% RH). The pelletization of PVA resin stored in the packaging bag thus produced was evaluated in the same manner as in Example 1. The evaluation result is shown below in Table 1.

Comparative Example 1

A packaging bag was produced as having substantially the same structure in substantially the same manner as in Example 1, except that a 100-μm thick aluminum film was used instead of the low-density polyethylene film. The 100-μm thick aluminum film had a methanol vapor transmission rate of 0 g/m$^2$·day (at 23° C. at 50% RH) and a water vapor transmission rate of 0 g/m$^2$·day (at 40° C. at 90% RH).

The pelletization of PVA resin stored in the packaging bag thus produced was evaluated in the same manner as in Example 1. The evaluation result is shown below in Table 1.

Comparative Example 2

A packaging bag was produced in substantially the same manner as in Example 1, except that the packaging bag structure included only the craft paper without the use of the methanol vapor permeable film layer. The craft paper had a methanol vapor transmission rate of higher than 1000 g/m²·day (at 23° C. at 50% RH) and a water vapor transmission rate of higher than 1000 g/m²·day (at 40° C. at 90% RH). The pelletization of PVA resin stored in the packaging bag thus produced was evaluated in the same manner as in Example 1. The evaluation result is shown below in Table 1.

TABLE 1

| | Methanol vapor permeable film | Methanol vapor transmission rate (g/m²·day) | Water vapor transmission rate (g/m²·day) | Pelletization evaluation |
|---|---|---|---|---|
| Example 1 | 100-μm thick low-density polyethylene film | 4 | 9 | A |
| Example 2 | 50-μm thick low-density polyethylene film | 7 | 18 | B |
| Example 3 | 30-μm thick low-density polyethylene film | 12 | 30 | B |
| Example 4 | 10-μm thick low-density polyethylene film | 37 | 90 | B |
| Comparative Example 1 | 100-μm thick aluminum film | 0 | 0 | D |
| Comparative Example 2 | — | >1000 | >1000 | E |

As apparent from the above results, the packaging bags of Examples ensure proper pelletization of the side-chain 1,2-diol-containing PVOH resin through stable operation of the melt extruder. In contrast, the packaging bag of Comparative Example 1 employing the aluminum film as the packaging bag formation material has a methanol vapor transmission rate of 0 g/m²·day (at 23° C. at 50% RH). Therefore, methanol evaporated from the side-chain 1,2-diol-containing PVA resin is confined in the packaging bag, but is not released from the packaging bag to the outside to thereby return into the side-chain 1,2-diol-containing PVA resin. When the side-chain 1,2-diol-containing PVA resin is fed into the melt extruder for the pelletization thereof, the organic solvent (methanol) is evaporated to prevent the proper feeding of the side-chain 1,2-diol-containing PVA resin. The packaging bag of Comparative Example 2 formed from the craft paper has a methanol vapor transmission rate of higher than 1000 g/m²·day and a water vapor transmission rate of higher than 1000 g/m²·day and, therefore, has a higher methanol reducing effect. However, the volatile content of the side-chain 1,2-diol-containing PVA resin is increased due to moisture absorption. As a result, the side-chain 1,2-diol-containing PVA resin cannot be properly fed into the melt extruder in the pelletization thereof. Further, the resulting pellets suffer from foaming and poorer pellet shape.

While specific forms of the embodiment of the present disclosure have been shown in the aforementioned inventive examples, the inventive examples are merely illustrative of the disclosure but not limitative of the disclosure. It is contemplated that various modifications apparent to those skilled in the art could be made within the scope of the disclosure.

The melt-processable PVA resin packaged in the inventive packaging bag for storage and transportation thereof is excellent in melt processability, because methanol remaining in the PVA resin can be released from the packaging bag to the outside during the storage.

The invention claimed is:

1. A method of storing a melt-processable polyvinyl alcohol resin comprising:
   providing a packaging bag comprising a film having
      a methanol vapor transmission rate of 0.5 to 1000 g/m²·day measured in conformity with Testing Methods for Determination of Water Vapor Transmission Rate of Moisture-Proof Packaging Materials—Dish Method specified in JIS Z0208,
      a water vapor transmission rate of not higher than 1000 g/m²·day measured at 40° C. at 90% RH in conformity with JIS Z0208, and
      a thickness of 1 to 500 μm; and
   sealingly packaging melt-processable polyvinyl alcohol resin particles in the packaging bag, the melt-processable polyvinyl alcohol resin particles comprising residual organic solvent;
   wherein a material for the film is at least one selected from the group consisting of high-density polyethylene, medium-density polyethylene, low-density polyethylene, polypropylene, and polyester, and
   wherein the packaging bag is capable of releasing the residual organic solvent evaporated from the melt-processable polyvinyl alcohol resin during its storage in the packaging bag.

2. The method according to claim 1, wherein the melt-processable polyvinyl alcohol resin is a polyvinyl alcohol resin having a primary hydroxyl group-containing structural unit at its side chain.

3. The method according to claim 1, wherein the structural unit having the primary hydroxyl group-containing structural unit at the side chain is a structural unit having a 1,2-diol structure at the side chain.

4. The method according to claim 1, wherein the film has a multilayer structure including
   a base layer,
   a methanol vapor permeable film layer, and
   a protective layer.

5. The method of claim 1, wherein the packaging bag has a thickness of 10 to 2000 μm.

6. The method of claim 4, wherein at least one of the base layer and the protective layer is craft paper.

7. The method of claim 1, wherein the content of organic solvent in the melt-processable polyvinyl alcohol resin particles is 0.1 to 10 wt %.

* * * * *